United States Patent [19]
Devorak

[11] 4,283,014
[45] Aug. 11, 1981

[54] MOBILE SPREADER APPARATUS DRIVE SYSTEM

[76] Inventor: Dwight F. Devorak, P.O. Box 268, Hazen, Ark. 72064

[21] Appl. No.: 28,243

[22] Filed: Apr. 9, 1979

[51] Int. Cl.³ .............................................. A01C 17/00
[52] U.S. Cl. ..................................... 239/677; 222/623; 239/156; 239/685
[58] Field of Search ........................ 222/55, 613–625, 222/334; 239/155, 156, 677, 685; 180/53 WA; 74/13, 14; 301/43, 52

[56] References Cited
U.S. PATENT DOCUMENTS

| | | | |
|---|---|---|---|
| 2,185,246 | 1/1940 | Cunningham | 74/14 X |
| 2,230,415 | 2/1941 | Smalley | 74/14 |
| 2,340,657 | 2/1944 | Goertzen | 239/673 |
| 2,442,743 | 6/1948 | Wester | 239/667 |
| 2,913,145 | 11/1959 | Hopkins et al. | 222/334 X |
| 3,019,025 | 1/1962 | Young | 239/685 X |
| 3,366,281 | 1/1968 | Wilder | 222/618 X |
| 3,417,926 | 12/1968 | Devorak | 239/673 |
| 3,463,398 | 8/1969 | Smith et al. | 222/334 X |
| 4,098,433 | 7/1978 | Oligschlaeger | 239/677 X |
| 4,141,395 | 2/1979 | Arzt | 180/53 WA X |
| 4,212,428 | 7/1980 | Walker | 222/622 X |

FOREIGN PATENT DOCUMENTS 105738  11/1938  Australia ................................. 239/685

Primary Examiner—F. J. Bartuska
Attorney, Agent, or Firm—Hill, Van Santen, Steadman, Chiara & Simpson

[57] ABSTRACT

A mobile wheel mounted spreader apparatus has a material feed conveyor and a broadcast spreading impeller fan. A wheel driven drive train operates through a gear reducer to drive the conveyor at a speed proportional to the towed speed of the spreader apparatus and operates through a hydraulic system, to drive the impeller fan at a constant speed regardless of variations in the towed speed of the spreader apparatus.

13 Claims, 9 Drawing Figures

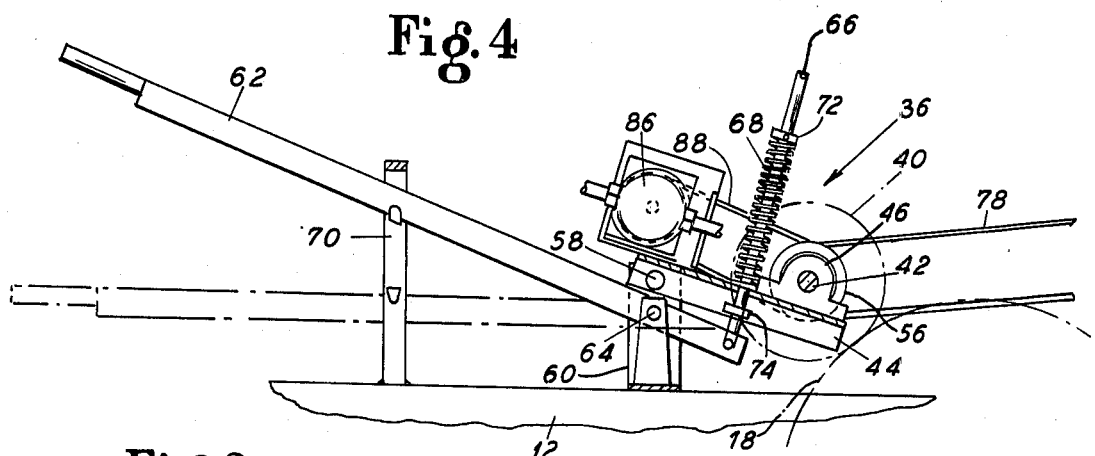
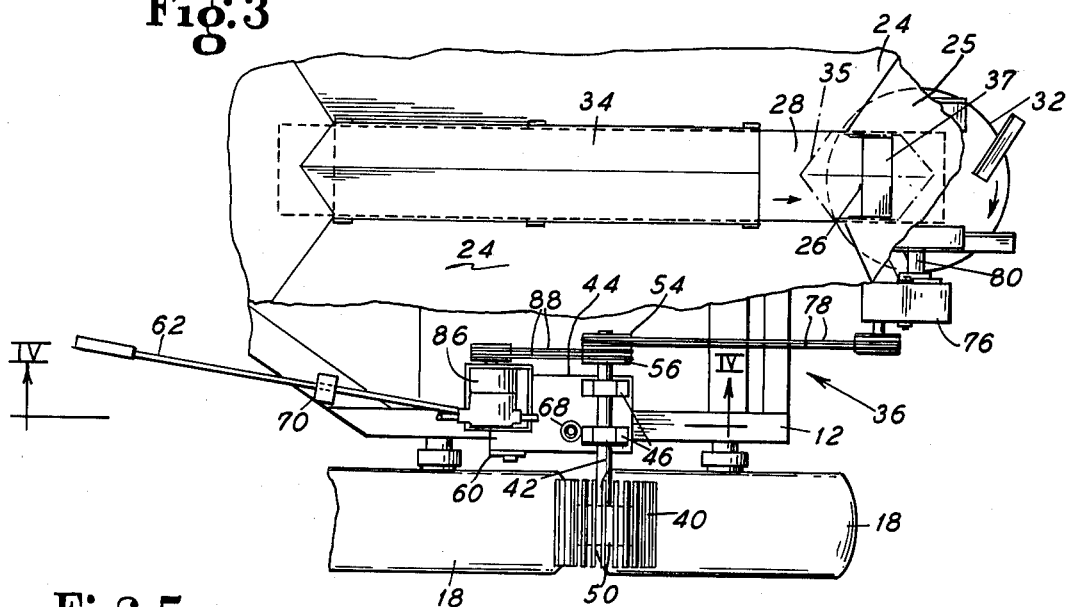
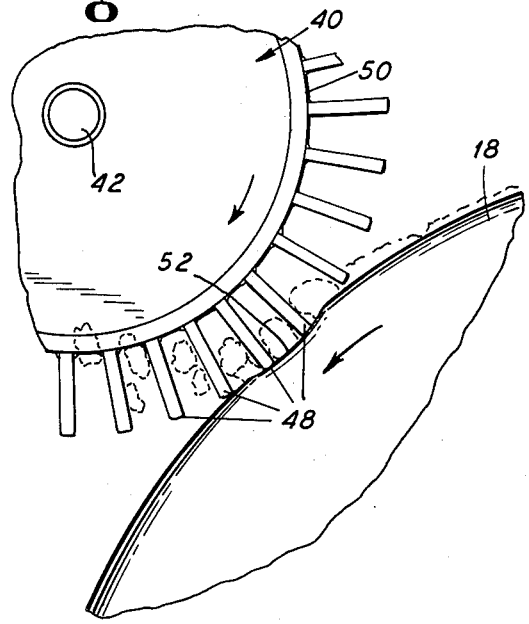

MOBILE SPREADER APPARATUS DRIVE SYSTEM

BACKGROUND OF THE INVENTION

This invention is directed to a spreading apparatus for granular material and more specifically to a broadcast spreading apparatus capable of laying down on a field a uniform pattern of fertilizer or other ground conditioning materials at a uniform density to promote optimum growth and highest yield in crops subsequently raised on these fields.

Many fan type centrifugal spreaders of the past, which are arranged to be towed by a tractor along the surface upon which the fertilizer is to be applied, have been provided with feed conveyors which are driven by a power take-off means from the tractor or by a driver wheel associated with one of the spreader's ground support wheels in order to deliver a proportional quantity of fertilizer to the spreading fan which is consistant with the towed speed of the spreading apparatus. The spreading fans are also directly driven by the same power source and are arranged to rotate at a speed to provide a preferred spreading pattern of fertilizer when the spreading apparatus moves along the field at an ideal rate of speed. Frequently, however, this ideal speed cannot be maintained, as for example with hilly ground, obstructions, etc., resulting in substantial variations in the conveyor and spreading fans speeds. Thus, while fertilizer will be delivered to the spreading fan at desirable volumes, despite towing speed variations, variation in the spreading fan rotational speed significantly alters the spreading pattern width of fertilizer layed down on a field. With adjacent patterns of fertilizer subject to similar variations in coverage a considerable area will be either overlapped and accordingly overfertilized, or will be missed altogether with no fertilizer spread on these areas.

Overfertilization, apart from being wasteful, results in excess stem growth with accompanying stem weakness. Herein, as for example with grain, the heads will often lay over or collapse to the ground, especially when subjected to adverse weather conditions, making this grain difficult if not impossible to harvest. Further, grain or other crops which were planted in the areas of no fertilization would produce a poor yield.

To overcome this problem, some spreaders in the past were provided with an independent power source such as an internal combustion engine to drive the feed conveyors and spreading fans. This arrangement adds considerably to the cost and operation of the spreaders. These machines also require transmissions and gear reducers to provide suitable speed controls for the conveyor and the spreader fans with an operator needed to make suitable adjustments from time to time to match the towing speed of the spreader unit. Thus, while the towing speed of the spreader unit will not affect the spreading pattern widths, adjustments must be made to match the conveyor speed (fertilizer delivered to the spreader fan) with the towed speed of the spreader unit if uniform coverage is to obtained.

Accordingly, a spreader which could continuously proportion the flow of fertilizer delivered to the spreading fans based on the towing speed of the spreading apparatus, yet distribute this proportioned quantity of fertilizer over a uniform area of a field, would be a decided advance in the state of the art.

SUMMARY OF THE INVENTION

A mobile spreading apparatus for distributing uniform amounts of soil conditioning, soil enrichment or other granular material over a field provides a storage hopper with a feed conveyor operatively associated with the lower portion of the conveyor to deliver granular material from the storage hopper, onto a rotating broadcast type spreading disc or impeller. The impeller throws the material outward horizontally over a fixed width, being driven along with the feed conveyor by a metal driver wheel through engagement with one of the ground wheels supporting the spreader apparatus for travel along the ground. The driver wheel drives the feed conveyor, through a gear reduction unit, at a predetermined proportioned speed relative to the ground wheel rotation or in other words at a speed proportional to the speed at which the spreader apparatus is towed along the field.

The impeller is driven at a constant rpm by a unique hydraulic system in which hydraulic pressure is generated by a pump, driven from the powered driver wheel.

The powered driver wheel while driving the pump at various speeds and accordingly producing fluctuating volumes of pressurized fluid is arranged to drive a hydraulic motor carrying the impeller at a constant rpm to distribute granular material along a field at a uniform width. This is accomplished with a flow regulating device which provides a constant flow of hydraulic fluid to the hydraulic motor, even at greatly reduced towing speeds and diverts excess volumes of pressurized fluid to the hydraulic system reservoir. Herein, each path or pattern of fertilizer layed down on a field is uniform in density and width with adjacent patterns layed down in abutting relationship without overlaps or gaps between adjacent patterns to make full use of granular material spread on a field.

It is an object of the invention to provide a broadcast spreading device which is arranged to scatter uniform volumes of granular material over a field without overlaps or gaps between adjacent patterns spread.

It is still another object of the invention to provide a broadcast spreading device which is driven by means of a hydraulic system powered by a driver wheel deriving power from a ground engaging support wheel to rotate a spreading impeller fan at a constant predetermined speed.

It is still another object of the invention to provide a drive for a broadcast type spreading device which is driven by a hydraulic sytem which is powered by a ground wheel driven power train to rotate a spreading impeller at a constant rpm despite variations in the speeds of the ground wheels.

Another object of the invention is to provide a broadcast type spreading device which includes a feed conveyor and a rotary spreading impeller both of which are driven by means of a power train drivably associated with a ground engaging support wheel whereby the conveyor is driven at speeds proportional to the speed of the ground wheel and whereby the rotary spreading impeller is driven at a constant predetermined speed.

Other objects, features and advantages of the present invention will be readily apparent from the following description of the preferred embodiments thereof taken in conjunction with the accompanying drawings.

BRIEF DESCRIPTION OF THE DRAWINGS

FIG. 3 is a fragmentary plan view of the spreader apparatus with portions broken away to show the ground wheel driven power train for the feed conveyor and impeller;

FIG. 4 is a vertical sectional view taken generally along the line IV—IV of FIG. 3;

FIG. 5 is a fragmentary side elevational view showing the metal driver wheel in frictional engagement with ground support wheel for powering the spreading apparatus;

FIG. 6 is a fragmentary transverse sectional view taken generally along the line VI—VI of FIG. 1;

DESCRIPTION OF THE PREFERRED EMBODIMENTS

Figure 1:
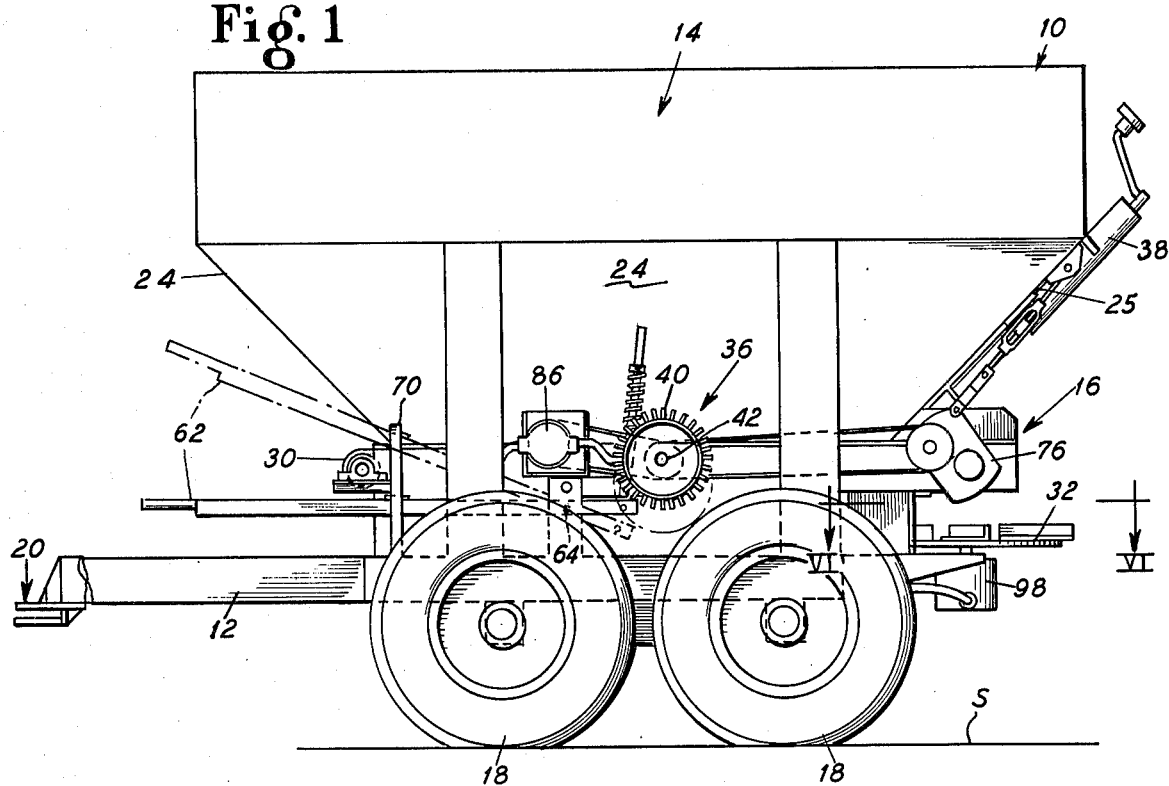
FIG. 1 is a side elevational view of a mobile spreader apparatus with the feed conveyor and impeller fan powered by a common ground wheel driven power train while providing appropriate operating arrangements to drive the impeller at a constant rotary speed while providing a variable speed drive for the feed conveyor which is proportional to the towed speed of the spreader apparatus.
Figure 2:
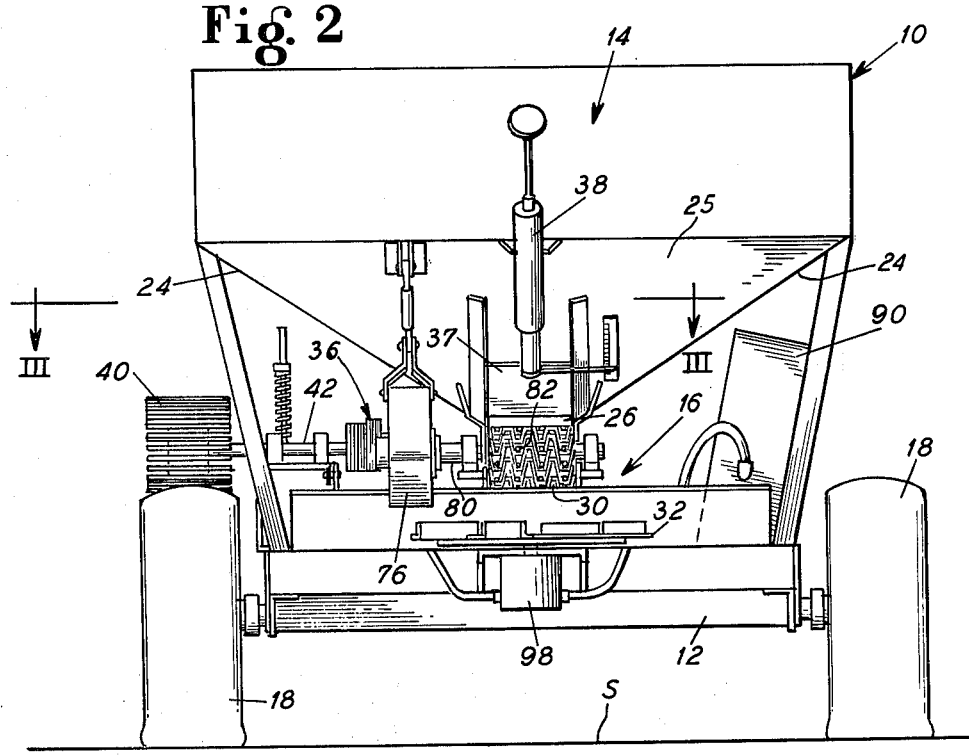
FIG. 2 is a rear elevational view of the spreading end of the apparatus shown in FIG. 1.

As disclosed in the accompanying drawings, a mobile spreader apparatus 10 is shown having a main frame 12, a granular material receiving hopper 14 and a spreading device 16 arranged to accurately distribute uniform volumes of soil conditioning material such as chemical fertilizers or the like over a suitable ground surface S. The main frame 12 is supported on a plurality of ground wheels 18 with a hitch 20 provided to towably connect the spreader apparatus 10 to a haulage vehicle or tractor 22 (see FIG. 9). The hopper 14 includes downwardly convergent side walls 24 with a discharge opening 26 provided in a rearwardly disposed wall 25. The hopper also includes a floor plate 28 over which a drag type conveyor 30 is movable to feed granular material from within the hopper 14 through the discharge opening 26 onto a rotary impeller disc or fan 32. Flow controlling baffles 34 and 35 are provided in the hopper over portions of the conveyor to provide a generally uniform unloading of the material along the length of the hopper. The impeller fan 32, along with the feed conveyor 30 and a ground wheel driven power train 36 comprise the elements of the spreading device 16 which is effective to produce the most accurate spread pattern obtainable in a ground wheel driven spreader apparatus. A slidable metering gate 37, which is adjustably positioned by a screw activator 38, sets the size of the discharge opening 26 to control the quantity of material passing therethrough, while a conveyor drive assemblage of the power train 34 controls the rate of conveyor feed. Thus it will be seen that the discharge opening size along with the conveyor speed will establish the volume of fertilizer fed onto the impeller fan 32 in a given time period for spreading by centrifugal action over the surface of a field. The density of material layed down on the field, however, also depends on the force of the centrifugal action or speed of the impeller fan 32. Obviously, if the rotating speed of the fan is high the volume of fertilizer deposited on the fan will be distributed over a wider area than if the fan 32 is caused to rotate at a lower speed. Accordingly, the width of the fertilizer "pattern" layed down, with a corresponding density of fertilizer spread, is directly related to the speed of the impeller fan 32 rotation, i.e. the centrifugal force developed. It is therefore extremely important to provide a spreading apparatus with a uniform rotational impeller fan speed in order to maintain a consistent spreading pattern.

Now with specific reference to FIGS. 3, 4, and 5 of the drawings it can be seen that the power train 36 is driven from a metal driver wheel 40 which is brought into frictional engagement with one of the ground wheels 18 to derive power therefrom to rotatably drive a transfer shaft 42. The transfer shaft 42 supports the driver wheel 40 on a pivot frame 44 by means of bearings 46. A series of transverse cleats 48, spaced circumferentially about a rim member 50 of the metal drive wheel 40, are urged against a ground contacting surface 52 of the wheel 18 to transmit the rotational motion of the wheel 18 to a pair of drive sheaves 54 and 56 carried on the transfer shaft 42. The cleats 48 are effective to penetrate dirt and debris adhering to the surface 52 to achieve a positive driving contact with the wheel 18 while providing a large degree of self-cleaning as best seen in FIG. 5.

The pivot frame 44 is supported for pivotal movement about a pin 58 carried in a pair of mounting lugs 60 which are secured to the main frame 12. A lever arm 62 is also pivotally supported on main frame on a fulcrum pin 64 with one end of the arm 62 extending beneath the pivot frame 44 and having a rod 66 carried thereon and extending upward through a hole in said frame 44. The rod 66 guidably supports a biasing spring 68, which when loaded exerts a downward force on the frame to press the cleats 48 of the driver wheel 40 into firm contact with the surface 52 of the ground wheel 18. The spring 68 is loaded by shifting the lever arm 62 from the broken line position to the solid line position of FIG. 4. An adjustable collar 72 securable about one end of the rod 66 provides a means for setting the biasing force of the spring 68, while a fixed collar 74 on the rod 66 beneath the pivot frame 44 is provided for elevating the pivot frame to declutch the driver wheel 40 from the ground wheel 18, as shown in FIG. 1. A latch member 70 retains the lever arm 62 in its driving and declutched positions. Now when the spreader apparatus 10 is towed along the surface S and with the lever arm 62 in the driving position, the sheave 54 is powered by way of the driver wheel 40 and the transfer shaft 42 to drive a gear box reducer 76 by means of a pair of drive belts 78. The gear box reducer's power output shaft 80 is coupled to a conveyor drive sprocket 82 which drivably meshes with the feed conveyor 30 to deliver granular material from the hopper 14 through the discharge opening 26 and onto the impeller fan 32. It should be understood that since the gear box reducer 76 is driven from the ground wheel 18, any variations in the rotational speed of the ground wheel (towing speeds) will vary the driven speed of the gear box reducer and accordingly the rate with which the feed conveyor deposits fertilizer on the spreading impeller fan 32. Thus, a volume of fertilizer is consistently delivered to the fan 32 in a direct proportion to the distance covered by the mobile spreader apparatus 10 along the surface S, regardless of the towed speeds of the spreader.

While it is highly desirable to vary the feed conveyor speeds to match the distance traversed by the spreader apparatus it is extremely *undesirable* to vary the rotational speed of the impeller fan 32 which would adversely affect the spreading pattern of the granular material layed down on a field which will be discussed later. As best seen in FIG. 6, the impeller fan 32 is provided with a series of slinger members 83 affixed to the fan at peripheral angles to provide optimum material dispersement.

Figure 7:
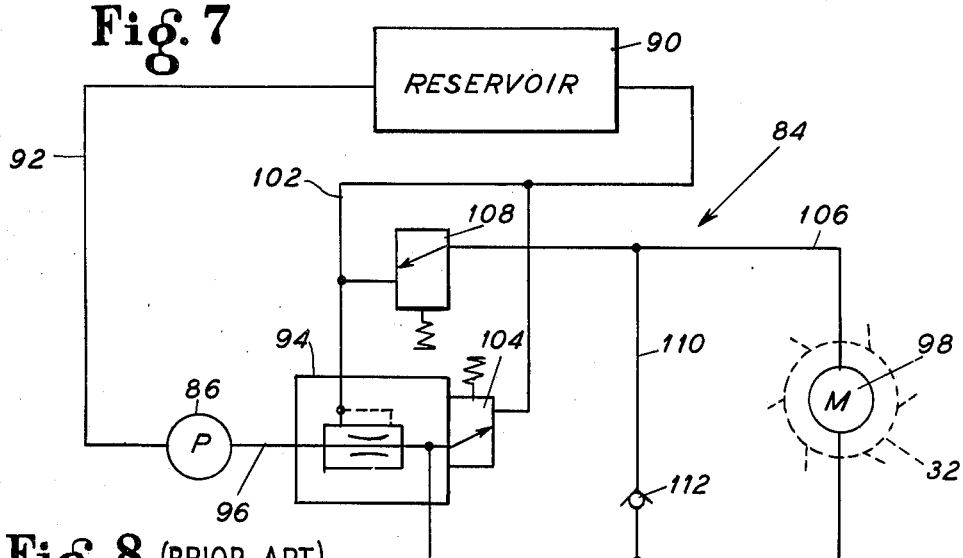
FIG. 7 is a diagrammatic showing of the fluid circuit used to drive the spreading impeller fan.

The ground wheel driven power train 36, which as described provides an ideal drive arrangement for the feed conveyor 30, is also utilized to drive the fertilizer spreading impeller fan 32 through the use of a unique hydraulic drive system 84 as best seen in FIG. 7. Therein, the sheave 56 mounted on the transfer shaft 42 adjacent to the sheave 54, drives a high capacity hydraulic pump 86 by means of a pair of drive belts 88. The hydraulic pump 86 is connected to a reservoir 90 by a suction line 92 and delivers pressurized hydraulic oil to a flow regulating device 94 by way of a pressure line 96. The volume of oil directed to the flow regulating device 94 is, of course, dependent on the rotational speed of the hydraulic pump 86. The pump being driven at speeds reflecting the rotational speeds of the ground wheels 18. Accordingly, the flow regulating device 94 is subjected to considerable volumetric fluctuations. However, a hydraulic motor 98, drivably carrying the impeller fan 32, is supplied with oil at a fixed rate of flow from the flow control regulating device 94 even though wide variations in the towing speeds of the spreader apparatus 10 may be encountered.

Although the pump 86 output capacity, at normal spreading speeds is considerably greater, only about 10 gallons per minute (38 liters per minute) of pressurized hydraulic oil is directed to the motor 98 by the flow regulating device 94 through a pressure line 100, with excess volumes of oil bypassed to the reservoir 90 through a tank return line 102. With a flow rate of approximately 10 gallons per minute driving the motor 98, the impeller fan 32 is driven at a rotational speed of approximately 800–850 rpm which is effective to spread granular material, deposited onto the fan 32, over a spread pattern width of 40 feet. The pump 86 is of a size to produce at least 10 gallons per minute whenever driven by the power train 36 at normal spreading speeds (4 mph or more). Only when the spreader apparatus 10 is towed at speeds below 4 mph will the spread pattern diminish in width.

The flow control regulating device 94 may be of any suitable configuration such as for example a "Brand" model BGR58 priority divider flow control valve which preferably includes a relief valve 104 to limit overload pressures in the system due to a stalled feed conveyor or impeller fan or other similar problems. A motor outlet line 106 runs between the motor 98 and the line 102 with a back pressure producing valve 108 connected in the line 106. This valve is set to a relief pressure of approximately 15 psi (44 kilograms per square centimeter) which is effective to block the outlet tank return flow to the reservoir 90 from the motor 98 when the motor acts as a pump. Herein, immediately after the mobile spreader apparatus 10 stops after completing a spreading pattern and the ground wheels no longer drive the pump 86 through the power train 34, the inertial forces in the spinning impeller disc 32 drives the motor 98 as a pump. The line 100 which normally serves as a pressure line then becomes a suction line and the line 106 becomes a pressure line. Since oil no longer comes from the flow regulating device 94, a branch or by-pass line 110 is provided to allow oil to circulate through the motor 98, the lines 106, 110, 100 and back to the motor 98 until the stored kinetic energy of the rotating impeller fan 32 is safely dissipated thereby eliminating shock loads in the hydraulic system which would otherwise be associated with sudden stops normal to the spreading operation. A check valve 112 is provided in the line 110 to prevent a short-circuited hydraulic flow from the regulating device 94 back to the reservoir 90 through the branch line 110 during normal operation. However, as soon as the motor begins to act as a pump, the minimal back pressure in the line 106 and line 110, produced by the valve 108, provide a positive supply of oil to the intake side of the motor 98 by way of the check valve 112 and line 100 to prevent cavitation in the motor 98. Obviously, when the spreader apparatus stops, the conveyor also stops and fertilizer is no longer deposited on the impeller fan 32. Thus, the fan may still be allowed to rotate after the spreader apparatus stops without wasting fertilizer.

Figure 8:
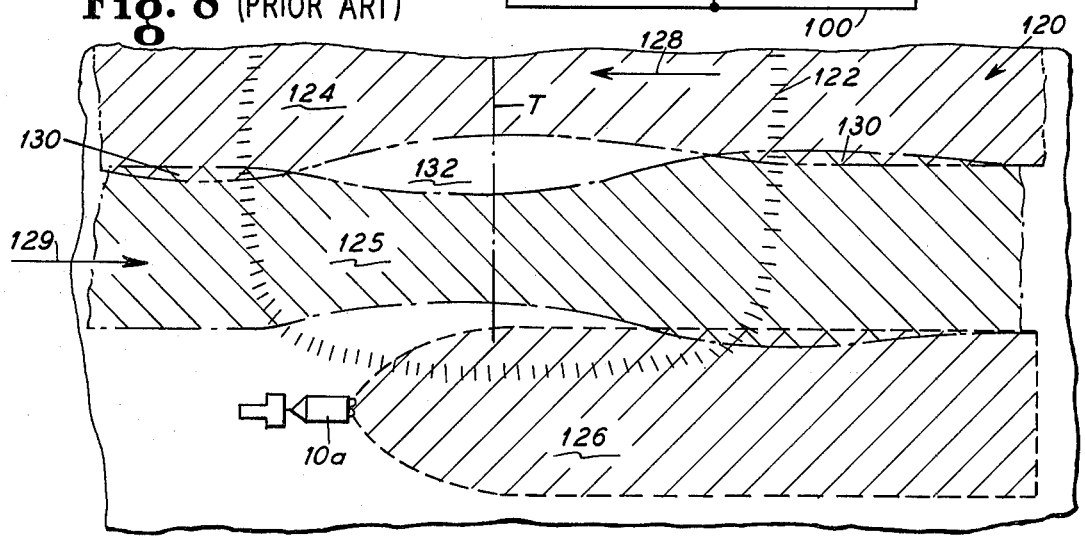
FIG. 8 is a diagrammatic plan view of a portion of a field upon which fertilizer is being spread by a spreader of the type used in the prior art and illustrating the non-uniform spreading patterns frequently associated therewith.

Now with specific reference to FIG. 8 of the drawings, a prior art apparatus 10a is shown in operation laying down typical spread patterns of fertilizer on a field 120, in which the spreading patterns are caused to be distorted due to one of various conditions normally encountered in a fertilizing operation. The field 120 is seen to have a hill or rise 122 intersecting the spreading patterns 124, 125 and 126 layed down in adjacent paths. Starting with the path 124 and with the spreader apparatus 10a being towed by the tractor 22 in the direction of the arrow 128, as the tractor and towed spreader ascends the hill 122, it will gradually slow down until the hill top (designated T) is reached; whereupon, due to gravity, the spreader will then accelerate going down the hill. Then moving in the direction of the arrow 129 when spreading the adjacent pattern 125, a similar speed influencing condition would be encountered with the spread pattern widths varied considerably since in the past, both the conveyor and spreader device were driven in common from the ground wheels directly. The spread pattern variations as generally shown in FIG. 8 produce substantial areas of overlapping 130 and other areas as at 132 which receive no fertilizer at all. The next pattern 126 is still effected by the non-uniform pattern of 125 with related areas of missed or overfertilized areas. Obviously, any obstructions or conditions which provide a speed variation of the spreader apparatus would adversely affect the spreading patterns. Even with smooth flat ground, a machine operator will often find that he has unintentionally varied the speed of his vehicle.

Figure 9:
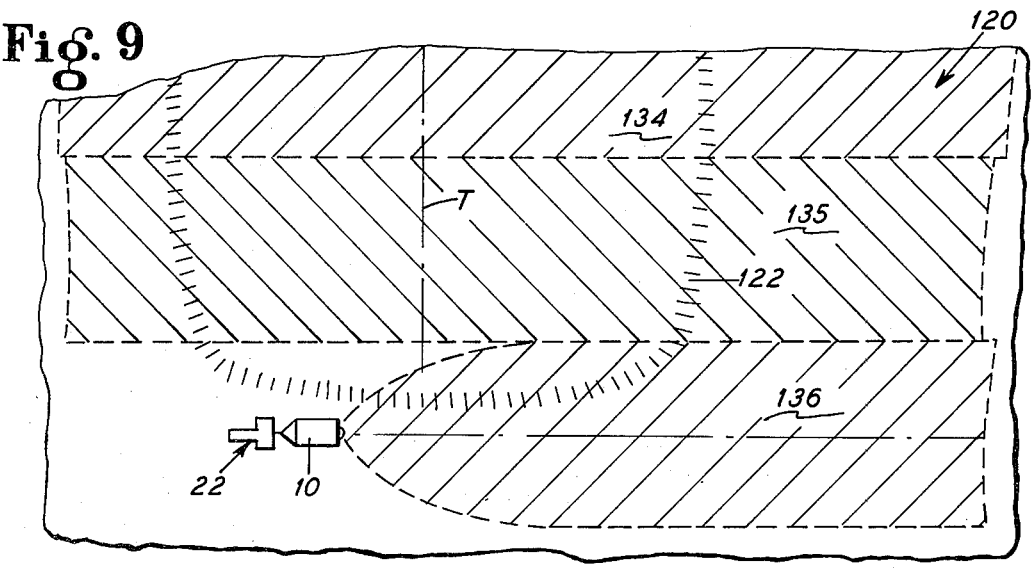
FIG. 9 is a view similar for FIG. 8 but showing the uniform spreading patterns customarily layed down on the field by the spreading apparatus constructed in accordance with the principles of this invention.

Now in FIG. 9, the same field 120 is represented with the hill 122 as shown in FIG. 8. Herein, although the speeds of the towed spreader apparatus 10 is similarly affected while traversing the hill 122, the unique hydraulic drive system 84 will achieve uniformly spread fertilizer patterns 134, 135 and 136 which can be layed down in adjacent, non-overlapping swaths or ribbons with generally uniform density of material spread over the entire field 120.

In some instance where a haulage vehicle is equipped with a hydraulic pressure system with a pump and reservoir available on the tractor 22 for operation of the motor 98, the lines 96 and 102 can accordingly be arranged to carry hydraulic oil between the tractor and mobile spreading apparatus 10. In this embodiment, although the pump is carried on the tractor, it is still subject to similar volumetric output fluctuations and requires the use of a hydraulic drive system for the spreader apparatus as provided in the embodiment of FIG. 7.

Although the teaching of my invention has been described with references to specific embodiments, it is to be understood that these are by way of illustration and that variations and modifications may be effected without departing from the spirit and scope of the novel concepts of my invention.

I claim:

1. A mobile spreader apparatus for uniformly distributing soil conditioning granular material over a broad ground surface comprising:
   a granular material receiving hopper having a floor plate and side retaining walls with a discharge opening at a rear end of said hopper;
   a plurality of ground wheels for supporting said hopper for movement along the surface at varying speeds;
   a feed conveyor extending along said hopper floor plate for moving granular material from said hopper through said discharge opening;
   an impeller fan positioned adjacent said discharge opening to receive granular material from said feed conveyor for broadcast spreading over said broad ground surface; and
   a ground wheel driven power train including:
      a driver wheel means being frictionally engageable with one of said ground wheels to transmit rotational movement from said ground wheel to said driver train;
         said driver wheel means comprising a self-cleaning metal driver wheel including a rim with a series of circumferentially spaced transverse cleats carried thereon, said cleats projecting laterally beyond said rim allowing dirt and debris to pass through the space between adjacent cleats;
      a gear reducer driven from said driver wheel and arranged to drive said feed conveyor as a function of the forward speed of the mobile spreader apparatus along the ground surface; and a hydraulic drive system including:
      a pump driven by said driver wheel and producing a variable flow fluid output which is a function of the rotational speed of said driver wheel;
      a flow divider means connected to said pump to receive said pump output and arranged to separate a substantially fixed rate of flow from said variable flow fluid output; and
      a hydraulic motor drivably connected to said impeller fan and arranged to receive said separated fixed rate of flow from said flow divider means to drive said impeller fan at a substantially fixed rotational speed,
whereby said impeller fan is driven hydraulically at a constant speed and said feed conveyor is driven mechanically at a speed proportional to the speed of the spreader apparatus movement along the surface to achieve a distribution pattern which is uniform in width and density regardless of the variations in speeds encountered during normal operating conditions.

2. The mobile spreader apparatus of claim 1, wherein said driver wheel means is moved into frictional engagement with one of said ground wheels by a clutching means to transmit rotational movement from the ground wheel to the power train.

3. The mobile spreader apparatus of claim 1, wherein said metal driver wheel is rotatably carried on a pivot frame for frictional engagement with one of said ground wheels, said ground wheels being equipped with inflated tires, and said metal driver wheel cleats have generally flat gripping faces carried thereon to provide a positive driving contact with the ground wheel to drive the power train at a speed reflective of the speed of the spreader apparatus movement along the ground surface.

4. The mobile spreader apparatus of claim 3, wherein the pivot frame is moved to a drive position by a clutch means, said clutch means includes a lever arm, connected to said pivot frame with a spring means whereby the metal driver wheel is biased against the ground wheel.

5. The mobile spreader apparatus of claim 1, wherein the hopper includes a metering gate which is adjustably set to control the size of the discharge opening.

6. The mobile spreader apparatus of claim 1, wherein said hydraulic drive system further includes a reservoir connected to said pump and said flow divider means directs a fixed flow rate of pressurized hydraulic oil to the motor while by-passing excess volumes of oil to the reservoir whereby volumetric fluctuations of oil produced by the pump do not effect the rotary speed of the impeller fan.

7. The mobile spreader apparatus of claim 6, wherein the hydraulic motor includes an inlet port and an outlet port with a by-pass connection therebetween to provide a recirculating loop for the free passage of hydraulic oil through the hydraulic motor whenever the motor acts as a pump to eliminate shock loads in the hydraulic drive system.

8. The mobile spreader apparatus of claim 7, wherein the hydraulic drive system includes: an intake line, connected between the flow divider means and the inlet port of the motor; a return line connected between the reservoir and the outlet port of the motor; and a by-pass line connected between the intake line and return line to provide the recirculating loop for passage of hydraulic oil through the motor whenever the motor is caused to act as a pump, the hydraulic system also includes a back pressure valve connected in the return line, downstream from the by-pass line connection, to maintain a suitable supply of oil in the recirculating loop and further including a check valve in the by-pass line to prevent shortcircuiting of hydraulic oil when the motor is powered from the pump.

9. A ground wheel driven power system for powering a spreader apparatus which includes spreading means with an impeller fan for distributing soil conditioning granular material over a broad ground surface and a feed conveyor means for delivering said granular material to said impeller fan, said spreader apparatus being mounted on ground wheels for movement along said ground surface at varying speeds, said power system including a hydraulic drive system and a mechanical drive system both systems being driven by a ground wheel driven power train having a metal driver wheel frictionally engageable with one of the spreader apparatus ground wheels; said driver wheel means comprising a self-cleaning metal driver wheel including a rim with a series of circumferentially spaced transverse cleats thereon; said cleats projecting laterally beyond said rim allowing dirt and debris to pass through the space between adjacent cleats; said hydraulic system includes a hydraulic pump connected to a reservoir and driven at random speeds by the power train, being responsive to the varying speeds of the mobile spreader apparatus movement along the ground surface whereby varying volumes of pressurized hydraulic fluid are generated by the pump and directed to a priority divider flow regulating device which separates a fixed predetermined working flow rate portion from the varying volumes of hydraulic fluid and directs this fixed flow rate portion to a hydraulic motor, which is drivably associated with the impeller fan to thereby rotatably drive the spreader fan at a constant rotary speed to distribute a uniform width of granular material on the ground surface, while a fluctuating excess portion of the varying volumes of hydraulic fluid is by-passed to the reservoir, and said mechanical drive system includes a gear reducing means drivably connected to said metal driver wheel and having a driving connection to said feed conveyor means to operate said feed conveyor at speeds directly proportional to the speed at which the spreader apparatus moves along said ground surface to deliver a volume of granular material to said impeller fan for distribution which is a function of the forward speed of said spreader apparatus whereby a uniform width and density of granular material are distributed on said ground surface regardless of the variations in speed encountered during normal operating conditions.

10. The ground wheel driven power system of claim 9, wherein the hydraulic motor inlcudes an inlet port and an outlet port with a by-pass connection therebetween to provide a recirculating loop for the free passage of hydraulic oil through the hydraulic motor whenever the motor acts as a pump to eliminate shock loads in the hydraulic system.

11. A ground wheel driven power system of claim 10, wherein the hydraulic system includes: an intake line, connected between the priority divider flow regulating device and the inlet port of the motor; a return line connected between the reservoir and the outlet port of the motor; and a by-pass line connected between the intake line and return line to provide the recirculating loop for passage of hydraulic oil through the motor whenever the motor is caused to act as a pump, the hydraulic sytem also includes a back pressure valve connected in the return line, downstream from the by-pass line connection, to maintain a suitable supply of oil in the recirculating loop and further including a check valve in the by-pass line to prevent short-circuiting of hydraulic oil to the reservoir when the motor is powered from the pump.

12. A wheel-mounted spreader apparatus comprising:
conveyor means forming a material feed conveyor for feeding a supply of soil conditioning granular material to a point of utilization,
impeller means forming a broadcast impeller fan for spreading the granular material in a broad selected pattern,
and a wheel-driven drive train having a driver wheel and comprising
a gear reducer interposed between the driver wheel and the conveyor means to mechanically operate the material feed conveyor as a function of the forward speed of the spreader apparatus;
a hydraulic pump having a driven connection with a driver wheel and delivering a variable flow which is a function of the rotational speed of the driver wheel;
flow proportioning means receiving the discharge from said pump and being construed to deliver a substantially fixed rate of flow to a point of utilization;
a hydraulic motor receiving said fixed rate of flow and driven thereby and being connected to hydraulically operate said impeller means to drive said broadcast impeller fan at a substantial fixed rotational speed; and
said driver wheel comprising a self-cleaning metal driver wheel having a plurality of spaced apart cleats extending axially outward beyond the metal driver wheel for allowing dirt and debris to pass through the spaces between adjacent cleats and effecting the self-cleaning of said driver wheel.

13. In a wheeled-mobile spreader apparatus the improvement of a self-cleaning friction drive comprising:
a power train having a rotatable transfer shaft;
a movable metal driving wheel connected to said shaft and adjusted to be selectively engaged with a ground wheel,
said driving wheel comprising a rim member,
a row of transverse cleats spaced circumferentially about said rim member and projecting radially outwardly thereof sufficient so that the cleats are urged against the adjoining ground contacting surface of the ground wheel to penetrate dirt and debris adhering to the surface and to achieve positive driving contact with the ground wheel and said cleats extend axially outward beyond the metal wheel and have spaces between them allowing dirt and debris to pass so that said drive wheel is essentially self-cleaning.

* * * * *